Figure 1:
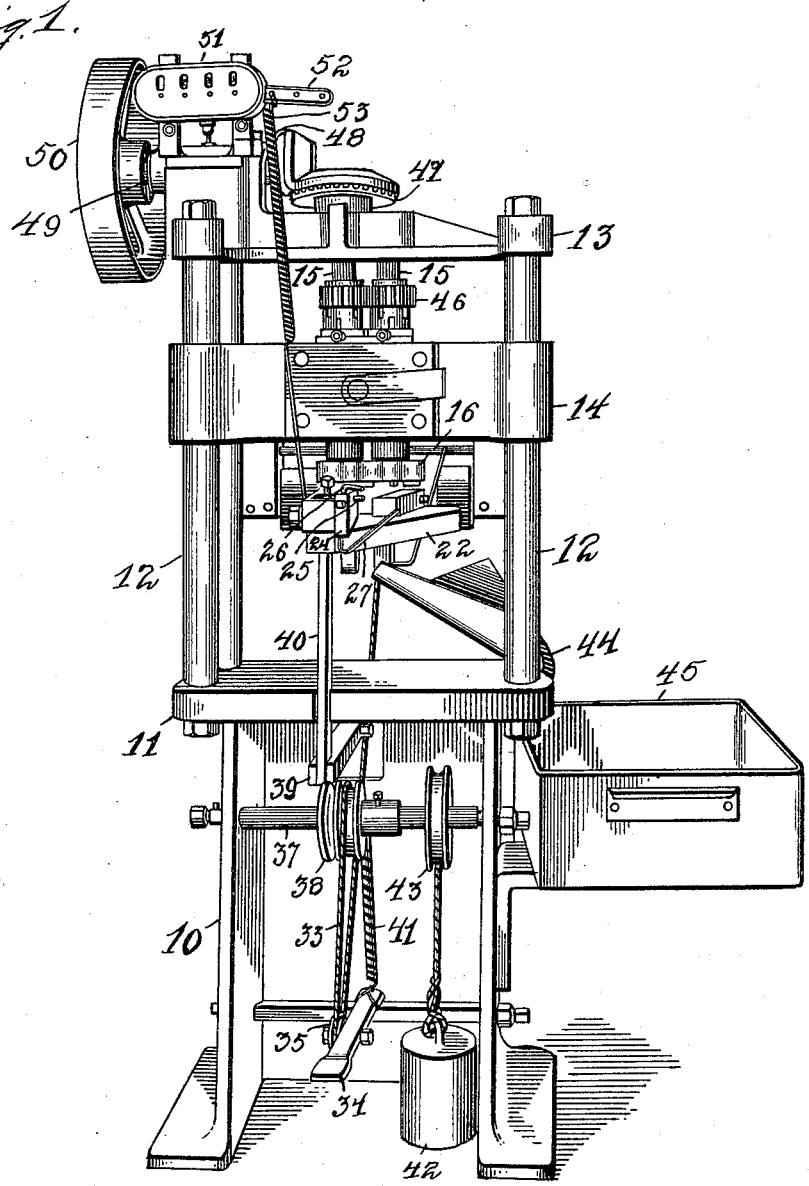

J. E. JOHNSON.
NURLING MACHINE.
APPLICATION FILED JAN. 14, 1911.

1,036,250.

Patented Aug. 20, 1912.
3 SHEETS—SHEET 1.

Witnesses
Inventor
John Emil Johnson
By S. Arthur Baldwin
Attorney

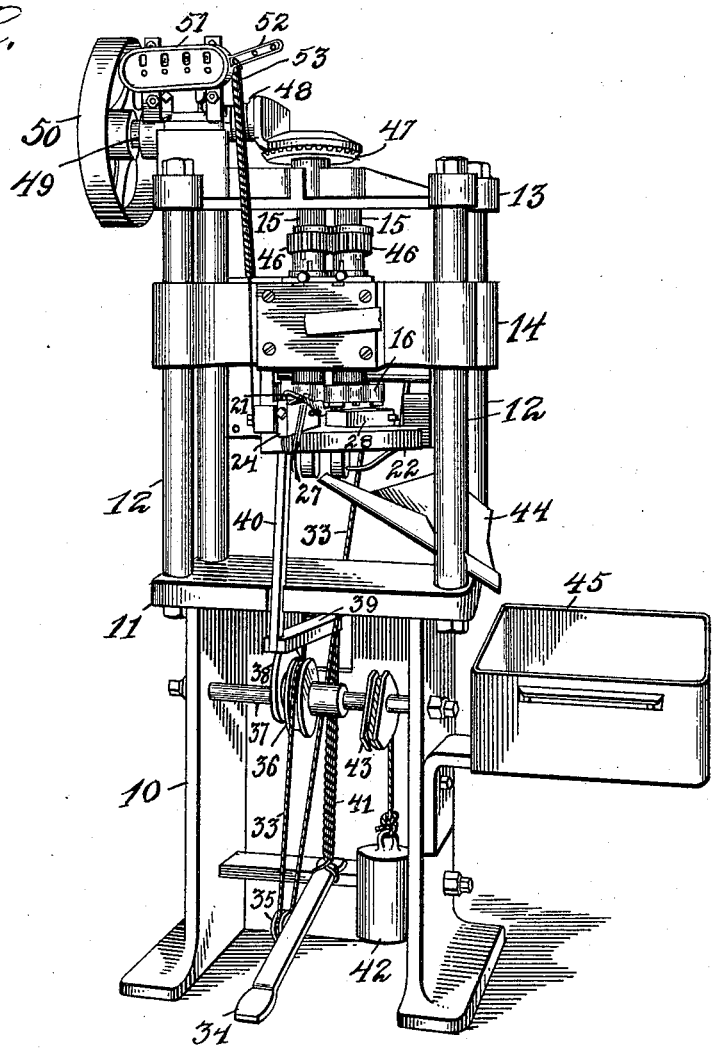

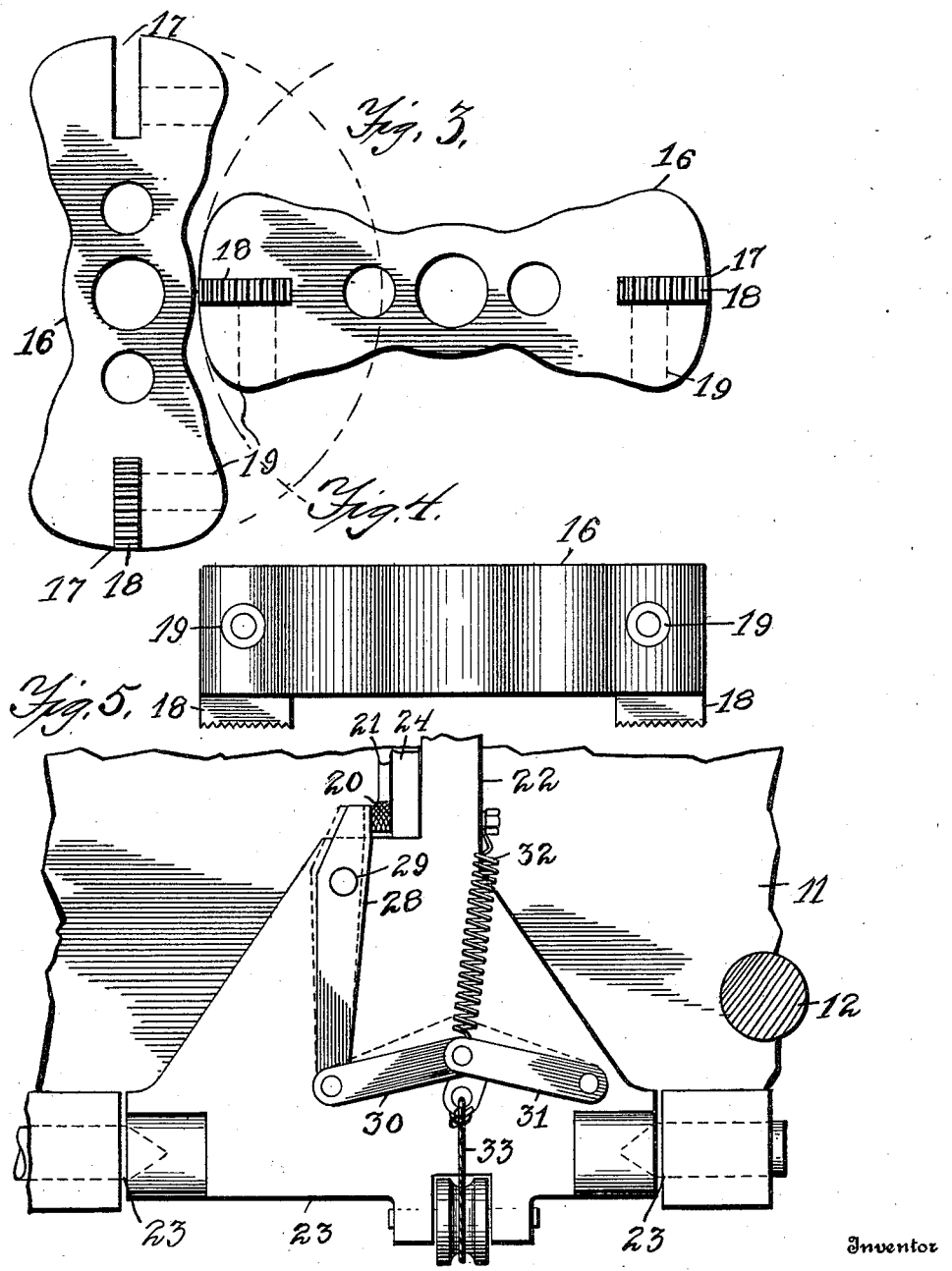

UNITED STATES PATENT OFFICE.

JOHN EMIL JOHNSON, OF JAMESTOWN, NEW YORK, ASSIGNOR TO THE CRESCENT TOOL COMPANY, OF JAMESTOWN, NEW YORK.

NURLING-MACHINE.

1,036,250.  Specification of Letters Patent.  Patented Aug. 20, 1912.

Application filed January 14, 1911. Serial No. 602,632.

*To all whom it may concern:*

Be it known that I, JOHN EMIL JOHNSON, a subject of the King of Sweden, and a resident of Jamestown, county of Chautauqua, and State of New York, have invented new and useful Improvements in Nurling-Machines, of which the following, taken in connection with the accompanying drawings, is a specification.

The invention relates to machines for nurling or serrating surfaces; and the object of my improvement is to provide, first, a clamp for holding the piece to be nurled, and second, a pair of alternating cutting jaws with means for actuating the same; and the invention consists in the construction and arrangement of the parts, as shown in this specification and accompanying drawings and pointed out in the claims.

In the drawings, Figure 1 is a perspective view of the nurling machine with the parts in normal position ready to receive a piece to be nurled; and Fig. 2 is a similar view of the nurling machine with a piece clamped therein and the cutters in contact therewith, in the operation of nurling the same. Fig. 3 is a plan view of the under side of the rotary cutters, showing their relation one to the other for cutting or serrating the toothed projections on the surface of the work to be nurled; and Fig. 4 is a side elevation of one of the rotary cutting heads showing the cutters projecting downward from each end. Fig. 5 is a plan view of the clamp for holding the piece to be nurled, as for example, one of the jaws of a pair of pliers or of a wrench.

Similar numerals refer to corresponding parts in the several views.

The numeral 10 indicates the lower portion of the frame which is preferably hollow cast iron with an open side toward the operator and a table or top 11 at its upper end.

A frame composed of rods 12 is mounted on the table 11 by being inserted through said table 11 and attached thereto by suitable nuts. A plate 13 connects the upper ends of the rods 12. A second plate 14 has holes therethrough for mounting on rods 12 between the plate 11 and plate 13 to support the parallel shafts 15 thereon in suitable journals. The shafts 15 extend below plate 14 and the rotary cutter heads 16 are attached to the lower ends of said shafts one to each shaft. The cutter heads 16 have a sidewise extension and are attached to shafts 15 in such a manner that they permit of the alternate rotation of the ends of the heads 16 over the same surface in intersecting planes, as outlined by the arcs of the circles in Fig. 3, without interfering with one another, the shafts being so spaced as to one another that the sidewise extending ends of each of the rotary heads pass freely by the cutaway side of the adjacent rotary head. Thus the heads would be at right angles to one another when the end of one rotary head comes opposite to the side of the other head, as shown in Fig. 3.

The ends of the heads 16 have the open ended slots 17 therein and the cutters or nurling tools 18 fit closely within the slots 17 and are held therein preferably by means of the hollow or key-operated set-screws 19. The nurling cutters 18 are toothed or serrated on their lower edges and are preferably equidistant in their extension below the head 16 so that they make an equal cut when they are caused to revolve with the shafts. The heads 16 extend out sidewise or laterally from the rotary heads or cutter wheels, forming arms or wings to support the cutters 18 at a sufficient distance from the center of the shaft 15 to give a broad curve to the cutting stroke across the face of the piece to be nurled. Two cutters 18 are preferably provided, one to each end or arm of each head in order that each cutter may take one half of the work. That is, the teeth in the lower edge of the cutters 18 are made coarse or sufficiently far apart and so set that the teeth in the cutter in the opposite end will cut between the channels formed by the first cutter to pass over the surface 20. It is thus apparent that each cutter will cut one-half of the nurling channels across the surface of the work.

It is apparent that the toothed cutters 18 on the oppositely placed heads 16 will make cuts curving in opposite directions, as shown on the face 20 of the wrench jaw or piece 21 in Fig. 5. The four sidewise cutters 18 on the opposite ends of the laterally extending heads 16 rotate in the operation of cutting, thus, first one of the cutters 18 at one end of one of the heads 16 will make its cut upon the surface 20 and then one of the cutters on the other head 16 will immediately follow the same with a cross cut, which cross cut is followed by the cutter in the other end of the first head, and finally the fourth cutter follows, each cutter perfecting its cut on the surface to be nurled. The cutters 18 may be set at graduated distances below the heads 16 when so desired, though they are usually set equidistant below said head.

The piece 21, to be nurled is supported in a clamp on the hinged mounted plate 22. A plate 22 is hinged by the bearings 23 at its rear side and has attached thereto the steel block 24. Block 24 has a pin 25 on the side and an angular pin 26 extending out from the upper side so that the piece 21 may be laid upon pin 25 beneath pin 26. A spring 27 extends out from the under side of piece 24 and is caught by the piece 21 between said piece when placing the same so as to automatically expel said piece 21 when released at the end of the operation.

Piece 21 is held against the side of piece 24 by means of a clamping arm 28 which is pivotally attached on plate 22 at 29 and has the toggle links 30 and 31 attached to one another and to the rear end of arm 28 and plate 22 and at right angles to arm 28 so that when the toggles 30 and 31 are drawn into line the front end of arm 28 is moved toward piece 24, thereby clamping the piece 21 to be nurled. A spring 32 is attached to the central joint of toggles 30 and 31 on their front side and to plate 22 to normally draw said toggles out of line and a cord 33 is attached to the rear side of said central joint of toggles 30 and 31 and extends down to a pedal lever 34 and around a pulley 35 on said lever and up to a second pulley 36 on a cross shaft 37. Cross shaft 37 supports a cam 38 which bears against the under side of a hinged arm 39. An arm 39 is pivotally attached at its front end to an upwardly extending bar 40 which is pivotally attached to plate 22, so that by pressing downward upon pedal lever 34 cam 38 causes arm 39 and vertical bar 40 to raise the front end of the hinged plate 22, thereby raising the piece 21 toward the cutters 18, the foot pressure giving the desired amount of feed. At the same time the depression of pedal lever 34 operates clamping arm 28 to hold the piece 21 firmly in position by means of toggles 30 and 31 and cord 33, a spring 41 is attached to pedal lever 34 to insure its return to the normal position as shown in Fig. 1. Also a weight 42 is attached to a cam shaped holder 43 on shaft 37 to return all the parts to normal position. The spring 32 also insures the withdrawal of the toggle pieces 30 and 31 from their bracing position in connection with arm 28 in holding the piece 21.

A chute 44 is provided beneath spring 27 and plate 22 to receive the piece 21 when it is released from clamping arm 28 and expelled from pins 25 and 26 by means of spring 27. A suitable receptacle 45 is supported on frame 10 beneath the mouth of spout 44 to receive the pieces 21 as fast as they are nurled and expelled from the machine.

The parallel shafts 15 have the intermeshing gears 46 thereon and a bevel gear 47 is attached to the upper end of one of the shafts 15. A bevel gear 48 intermeshes with bevel gear 47 and is mounted upon a horizontal shaft 49 which shaft 49 is revolubly mounted in a suitable journal on plate 13 and bears the driving pulley 50 thereon that shafts 15 may be caused to revolve by its being belted on to suitable means of power.

The operation of the nurling machine is as follows: The pulley 50 and shaft 49 are turned by a suitable belt thereby turning the covered bevel gears 47 and 48 and parallel shaft 15. The gears 46 cause the shafts to turn in opposite directions, thereby turning the cutter on nurling heads 16 in opposite directions. The part of the wrench or other piece to be nurled is then placed upon the pin 25 under pin 26 with the portion to be nurled facing upward. The spring 27 is pressed by the piece 21 against the side of the steel block 24. The foot is then placed upon pedal lever 34 and the downward pressure causes the clamping arm 28 to securely hold the piece 21 in place and continued pressure on pedal lever 34 causes the plate 22 to be raised so that the surface to be nurled comes into line with the cutters 18, which alternately cut the curved nurling channels therein thereby forming the nurled or serrated surface 20. As soon as the channels are cut sufficiently deep to give the proper amount of serration the foot pressure is relieved on the pedal 34 and the weight 42 with springs 41 and 32 return the parts to normal. Immediately upon the release of the pressure on the foot pedal 34, the clamping arm 28 releases the part 21 and spring 27 throws the part 21 into the chute 44 and it slides down into the receptacle 45. The plate 22 is connected by a coil spring 53 to arm 52 of the counter mechanism 51 and it is apparent that the reciprocating upward and downward movement of plate 22 will operate arm 52 thereby rendering a correct count of the pieces nurled.

It is apparent that the sidewise projection of the head 16 may be made in proportion to the work to be done and that the rotation of the heads will cover the space between the arcs which are outlined in dotted line in Fig. 3. The cutters 18 and slots 17 may be made of sufficient length to cover the entire space between the arcs crossed by the heads 16 or any portion of the same which is sufficient to attain the purpose. Thus for example, the nurling of wrench or plier jaws requires only a small cutter, as shown, whereas, the nurling of a broad plate would require a much larger cutter 18 than that shown in the drawings.

It is obvious also that for nurling many materials a single sidewise extension or arm with a single cutter thereon for each of the heads 16 would be sufficient. For steel and other metals the four toothed cutters, as shown are preferred, cutting the alternate grooves in the surface to be nurled.

What I claim as new and desire to secure by Letters Patent is:

1. In a machine of the class described, a plurality of cutters having sidewise extensions, and means for rotating said cutters to alternately operate in intersecting planes on the same surface to nurl it.

2. In a machine of the class described, parallel shafts, cutter heads on said shafts, and means for rotating said shafts to cause said cutter heads to alternate one another in operating upon the same surface.

3. In a machine of the class described, parallel shafts and means for rotating the same, said shafts geared to rotate in opposite directions, cutter heads mounted on said shafts to rotate in opposite directions with said shafts and alternately operate on the same surface.

4. In a machine of the class described, parallel shafts and means for rotating the same, cutter heads on said shafts each having a sidewise extension, a toothed cutter on each sidewise extension, said head spaced as to said cutter head extensions to allow the rotation of said cutters over the same surface.

5. In a machine of the class described, parallel shafts connected by suitable gears and means for rotating said shafts, a cutter head on each of said shafts having lateral arms, a cutter on each of said arms, and means for rotating said cutter heads to cause said cutters to alternately operate on the surface to be nurled.

6. In a nurling machine, a frame, nurling cutters revolubly mounted in said frame and means for actuating the same, a movable plate in said frame, means on said movable plate for holding the work, and means for raising said movable plate and the work against said revolubly mounted cutters.

7. In a nurling machine, a frame, a plate hinged on said frame, a clamp for holding the piece to be nurled on said hinged plate, nurling cutters revolubly mounted in said frame above said hinged plate and means for revolving the same, and means for raising said hinged plate and the piece to be nurled into line with said cutters.

8. In a nurling machine, a frame, a hinged plate in said frame, a clamp on said hinged plate for holding the work, a pedal lever mounted in said frame to actuate said clamp and raise said hinged plate, suitable nurling cutters mounted in said frame, and means for actuating said cutters.

9. In a nurling machine, a frame, revolubly mounted cutter heads in said frame, and means for rotating the same, a plate hinged in said frame beneath said cutters, a clamping arm on said hinged plate to hold the work, a toggle on said hinged plate attached to said clamping arm to brace the same, a pedal lever attached to said toggle to draw the same into the bracing position, and suitable springs and a weight to return said parts to normal position, substantially as and for the purpose specified.

10. In a nurling machine, a frame, parallel shafts revolubly mounted in said frame and means for rotating the same, cutter heads on said shafts having sidewise extending arms to rotate over the same surface, cutters in said arms, a movable plate in said frame, means on said plate for holding the work to be nurled, and means for raising said plate and the work into said space alternately crossed by said cutters, substantially as and for the purpose specified.

In testimony whereof I have signed my name to this specification in the presence of two subscribing witnesses.

JOHN EMIL JOHNSON.

Witnesses:
I. A. ELLSWORTH,
A. W. KETTLE.